United States Patent [19]

Vanderhelst

[11] Patent Number: 4,493,040

[45] Date of Patent: Jan. 8, 1985

[54] APPARATUS AND METHOD OF PHASE CONTROL FOR RESISTANCE WELDING AND OTHER RESISTIVE-INDUCTIVE LOADS

[75] Inventor: Peter W. Vanderhelst, Birmingham, Mich.

[73] Assignee: Midland-Ross Corporation, Cleveland, Ohio

[21] Appl. No.: 383,829

[22] Filed: Jun. 1, 1982

[51] Int. Cl.$^3$ .................. G06G 7/64; B23K 11/24
[52] U.S. Cl. .................. 364/477; 219/110; 219/109; 219/114; 219/130.5
[58] Field of Search .................. 364/477, 184, 189; 219/108, 109, 110, 114, 130.5

[56] References Cited

U.S. PATENT DOCUMENTS

| | | | |
|---|---|---|---|
| 4,024,371 | 5/1977 | Drake | 364/477 |
| 4,076,974 | 2/1978 | Gee | 219/108 |
| 4,104,724 | 8/1978 | Dix et al. | 364/477 |
| 4,254,466 | 3/1981 | Jurek | 219/110 |
| 4,289,951 | 9/1981 | Jurek | 219/114 |
| 4,301,351 | 11/1981 | Mathews | 364/477 |
| 4,302,653 | 11/1981 | Denning et al. | 219/110 |
| 4,387,289 | 6/1983 | Nakata et al. | 219/110 |
| 4,399,511 | 8/1983 | Jurek | 364/477 |
| 4,419,560 | 12/1983 | Zurek | 219/110 |

Primary Examiner—Jerry Smith
Assistant Examiner—John R. Lastova
Attorney, Agent, or Firm—H. Duane Switzer

[57] ABSTRACT

A computer-controlled welding apparatus includes a phase-controlled resistance welding circuit (A) for selectively conducting pulses of a welding current to a workpiece (B) and a control circuit (C) for controlling the conduction of the welding current. The control circuit includes a line clock generator (30) for determining the beginning of each voltage half line cycle and a conduction sensor (34) for determining whether or not a contactor (14) is conducting current to the workpiece. A microcomputer (40) is preprogrammed with a plurality of power factor correction curves, each of which represents weld current vs. firing angle for a fixed hangover angle. The computer is programmed to select one of the power factor correction curves. If the preceding half line cycle was conductive, the program selects the curve which corresponds to the hangover angle of the preceding half line cycle. If the present half cycle is the first conductive half cycle in a weld, the program selects the curve corresponding to a hangover angle of about 87°. During pulsation welding, the curve is selected based upon the hangover angle of the most recent conductive half cycle and the number of nonconductive half cycles therebetween. During each half cycle, the present angle (duration since the beginning of the half cycle) periodically addresses the curve and a corresponding weld current is retrieved. The retrieved weld current represents the weld current which would be produced if the container were rendered conductive at the present time, i.e., the present weld current. A comparator (86) compares a preselected weld current for the present half cycle with the present weld current. When the present weld current becomes coincident with the preselected weld current, the contactor is rendered conductive.

23 Claims, 6 Drawing Figures

APPARATUS AND METHOD OF PHASE CONTROL FOR RESISTANCE WELDING AND OTHER RESISTIVE-INDUCTIVE LOADS

BACKGROUND OF THE INVENTION

The present invention relates to the art of phase-controlling AC electric current or power which is applied to a load circuit having resistive and inductive components. The invention finds particular application in phase control for resistance welding and will be described with particular reference thereto. It is to be appreciated that the invention is also applicable to phase control in conjunction with other resistive-inductive loads such as motor controls, resistance heating, incandescent lighting, and the like.

A resistance welding apparatus commonly receives an AC electrical voltage. A contactor selectively gates portions of the current in each half line cycle to a welding load. Commonly, the welding load includes a welding transformer which is connected with a pair of electrodes that are clamped on either side of the workpiece to be welded. In resistance welding, the current of the AC power lags the voltage by a determinable phase angle. Because the contactor can only conduct current to the load in one direction at a time, the contactor cannot start conducting current to the load in one half cycle until the current from the other half cycle is extinguished. The maximum weld power is achieved by firing the contactor to gate current in each half cycle immediately upon extinction of the current in the preceding half cycle. Under this maximum power operating condition, the weld system is governed by the equations:

$$P = EI \cos \phi \quad (1)$$

$$I = \frac{E}{R + jwL} \quad (2)$$

$$\phi = \tan^{-1} \frac{wL}{R} \quad (3)$$

In the equations, P is the maximum available weld power, E is the weld voltage, I is the weld current, $\phi$ is the power factor angle, R is the resistance of the overall system including the workpiece being welded, j is the 90° operator, w is the frequency of the electric power, and L is the inductance of the overall system including the workpiece. The power factor angle is a system constant which is determined by the inductance and resistance of the contactor, the load circuit including the welding transformer, the welding electrodes, the workpiece, and the like.

To maintain the equations independent of the AC electric power, each line cycle is commonly described as having a duration of 360°. For 60 Hz. electric power, each degree is just under 50 microseconds in duration. To reduce the weld power or temperature, the firing angle, i.e., the angle or duration into each half line cycle at which the contactor is fired, can be retarded beyond the power factor angle. When the firing angle is retarded, less energy is stored in the inductive components of the circuit reducing the hangover angle, i.e., the angle or duration which the current pulse extends into the next cycle before it is extinguished.

In a phase-controlled system, it is known that the root mean square (RMS) value of the actual weld current is determined by the equation:

$$I_{RMS} = \left[ \frac{1}{\pi} \int_{a}^{b+\pi} \left[ \sin(wt - \phi) - \sin(a - \phi)e^{\frac{R(a-wt)}{wL}} \right]^2 d(wt) \right]^{\frac{1}{2}} \quad (4)$$

Here, and in addition to the above-noted designations, a is the firing angle, b is the hangover angle, t denotes time, and e is the natural logarithm. It is further known that there is a fixed relationship between the firing angle a, the hangover angle b, and the power factor angle $\phi$, which is governed by the equation:

$$\sin(b + \pi - \phi) = \sin(a - \phi)e^{\frac{R(a-b)}{wL}} \quad (5)$$

Thus, if two of the angles are known, the third can be calculated. The solutions for equations (4) and (5) are generally not determinable by classical techniques, but can be solved using iterative techniques.

Heretofore, many welding machines have been constructed with a first manual adjustment to adjust for the inherent power factor angle of the welding system and a second manual adjustment, commonly denoted as a percent heat adjustment, for adjusting the firing angle to select a percentage of the maximum available weld heat or current. Frequent recalibration of the power factor adjustment was required to maintain the weld heat constant. Mushrooming of the electrodes, variation in the thickness of the workpieces, differences in the surface properties of the workpieces, and the like would change the power factor angle of the system. The power factor calibration was also used to avoid saturation of the core of the welding transformer.

To avoid the frequent power factor recalibration, welding controls were developed which attempted to provide an automatic power factor correction. Many of these schemes were based upon determining the average power factor of the system and its variation over a plurality of preceding complete welds. Based on this average and variation in the power factor, the automatic control would project an anticipated power factor for the next complete weld or several welds. These automatic power factor control schemes had varying degrees of success but most led to the introduction of other problems into the control scheme.

To make the power factor correction more accurate, it has been proposed to base the power factor correction on the first cycle of the weld in progress. Specifically, this scheme included firing the first half cycle of the weld at a preselected firing angle and measuring the resultant hangover angle. The hangover angle from the first half cycle indexed or addressed a look-up table of data which related power factor to hangover angle for the preselected constant firing angle. The power factor from the look-up table was used to make the power factor adjustment in all subsequent half line cycles of the weld.

One of the problems with this power factor correction scheme is that it requires the first half cycle to be fired at the preselected firing angle which may be inappropriate for the selected weld. Further, if the subsequent cycles of the weld are to be much lower than the preselected first half cycle firing angle, the welding transformer may become overexcited with flux and interfere with proper control of the subsequent low current line cycles. A second problem is that the power factor does not necessarily remain constant over all cycles of the weld. During the weld, the circuit resistance is increased by the heating of the weld current conductors and the workpiece. The inductance is altered by the strong magnetic fields generated during the weld and by distortion of the conductors caused by the strong magnetic fields.

Another problem with the prior art welding controls resides in the fact that they are unsuited to preventing welding transformer core saturation during pulsation welding. In pulsation welding, the weld current is applied for several line cycles, then the contactor blocks the weld current for several line cycles, then the contactor again conducts the weld current for several line cycles, and so forth. This alternating conduction and nonconduction pattern may be carried out several times. Because the prior art devices do not control the first half cycle weld current in each group of welding pulses, the percent heat must be controlled separately for each first half cycle to prevent core saturation.

Still another problem with prior welding controls is that fluctuations in the RMS voltage received by the welding apparatus cause similar fluctuations in the maximum available weld current. This, in turn, causes fluctuations in the actual weld heat produced by a given percent heat setting. This failure to control the actual RMS weld current accurately diminishes the quality of the weld.

The present invention overcomes the foregoing problems and others to provide a welding apparatus and method for accurately controlling the RMS value of the weld current in every half line cycle of the weld.

SUMMARY OF THE INVENTION

In accordance with the present invention, there is provided a method and apparatus for determining the appropriate firing angle to achieve a preselected RMS weld current as a function of the hangover angle of a preceding half line cycle.

In accordance with a more detailed aspect of the invention, a computer-controlled welding apparatus is advantageously provided. A phase-controllable contactor means selectively conducts AC electric power to a welding load. A line voltage clock generator generates clocking signals in coordination with voltage line cycles of the AC electric power. A conduction sensing means produces a conduction signal which indicates whether the contactor means is conducting welding power to the welding load. A digital computer produces a digital preselected weld current signal which indicates a preselected weld current for each of a plurality of half line cycles and repeatedly produces digital present weld current signals indicating the weld current which would result if the contactor were rendered conductive at a plurality of times during each of the half line cycles. A comparing means compares the preselected and present weld current signal and selectively causes the contactor to conduct welding power to the welding load.

According to another aspect of the invention, a phase control apparatus controls AC power in a circuit in which an AC current component tends to lag an AC voltage component. A controllable contactor means selectively conducts the current component. A line voltage clock generator generates a line clock signal which indicates the phase of the AC voltage component. A conduction sensing means produces a conduction signal which indicates whether the contactor means is conducting. A preselected current memory means stores a preselected current signal which indicates a preselected current magnitude which is selected to be conducted by the contactor means during each of a plurality of voltage component half line cycles. A power factor correction curve memory means stores a plurality of data series which represent a relationship between current magnitude, firing angle, and hangover angle. Addressing the power factor correction curve memory means with a firing angle signal and a hangover angle signal retrieves a present current signal which indicates the current magnitude which is produced when the contactor is rendered conductive under the addressed firing and hangover angle conditions. A power factor correction curve selecting means selects a hangover angle signal for addressing the power factor correction curve memory means. A power factor correction curve reading means repeatedly generates firing angle signals for addressing the power factor correction curve memory means. Each of the firing angle signals corresponds to a duration since the beginning of each of the half line cycles. A comparing means compares the preselected current signal with the present current signal for selectively causing the contactor means to conduct current based upon the comparison.

In accordance with yet another aspect of the invention, a method of computer-controlled welding is provided. The method includes: retrieving a preselected weld current magnitude for the present half line cycle of the weld from memory; repeatedly determining during the present half line cycle the present weld current magnitudes which would result if the contactor were rendered conductive at each of a plurality of times in the present half line cycle; comparing the preselected weld current magnitude with each present weld current magnitude; and, rendering a contactor means conductive when the preselected and present weld current magnitudes are substantially coincident such that welding current is conducted to a welding load According to yet another aspect of the invention, there is provided a method of phase control for AC electric power in which a current component tends to lag a voltage component and wherein a plurality of data series, each of which represents a relationship between current magnitude and firing angle for one of a plurality of fixed firing angles, are stored. The beginning of a present voltage half line cycle is 10 determined and the duration which current from the preceding half cycle extends into the present half cycle is monitored to determine the hangover angle. One of the plurality of data series which corresponds to the determined hangover angle is indexed. During the present half cycle, the selected data series is addressed with a plurality of angles, each corresponding to a time since the beginning of the present half cycle, and the corresponding current is determined. The determined current from the selected data series is compared with a preselected current for the present half cycle. When the determined current and the preselected current are substantially coincident, conduction of the current component is commenced.

One advantage of the present invention resides in the provision of automatic power factor compensation without compromising other control operations or features.

Another advantage of the invention is that its effective prevention of welding transformer core saturation during pulsation welding.

Yet another advantage of the present invention is that it provides the true RMS weld current which is selected, even with fluctuations in the weld voltage.

Still further advantages of the present invention will become apparent to others of ordinary skill in the art upon reading and understanding the following detailed description of the preferred and alternate embodiments.

BRIEF DESCRIPTION OF THE DRAWINGS

The present invention may take form in various parts and arrangements of parts or in various steps and combinations of steps. The drawings are only for purposes of illustrating preferred and alternate embodiments of the invention and are not to be construed as limiting same.

DETAILED DESCRIPTION OF THE PREFERRED AND ALTERNATE EMBODIMENTS

A phase-controlled resistance welding apparatus includes a welding circuit or means A for selectively applying pulses of welding current to a workpiece B which is to be welded. A control circuit C controls the conduction of the welding current by the welding means A to the workpiece B.

Figure 1:
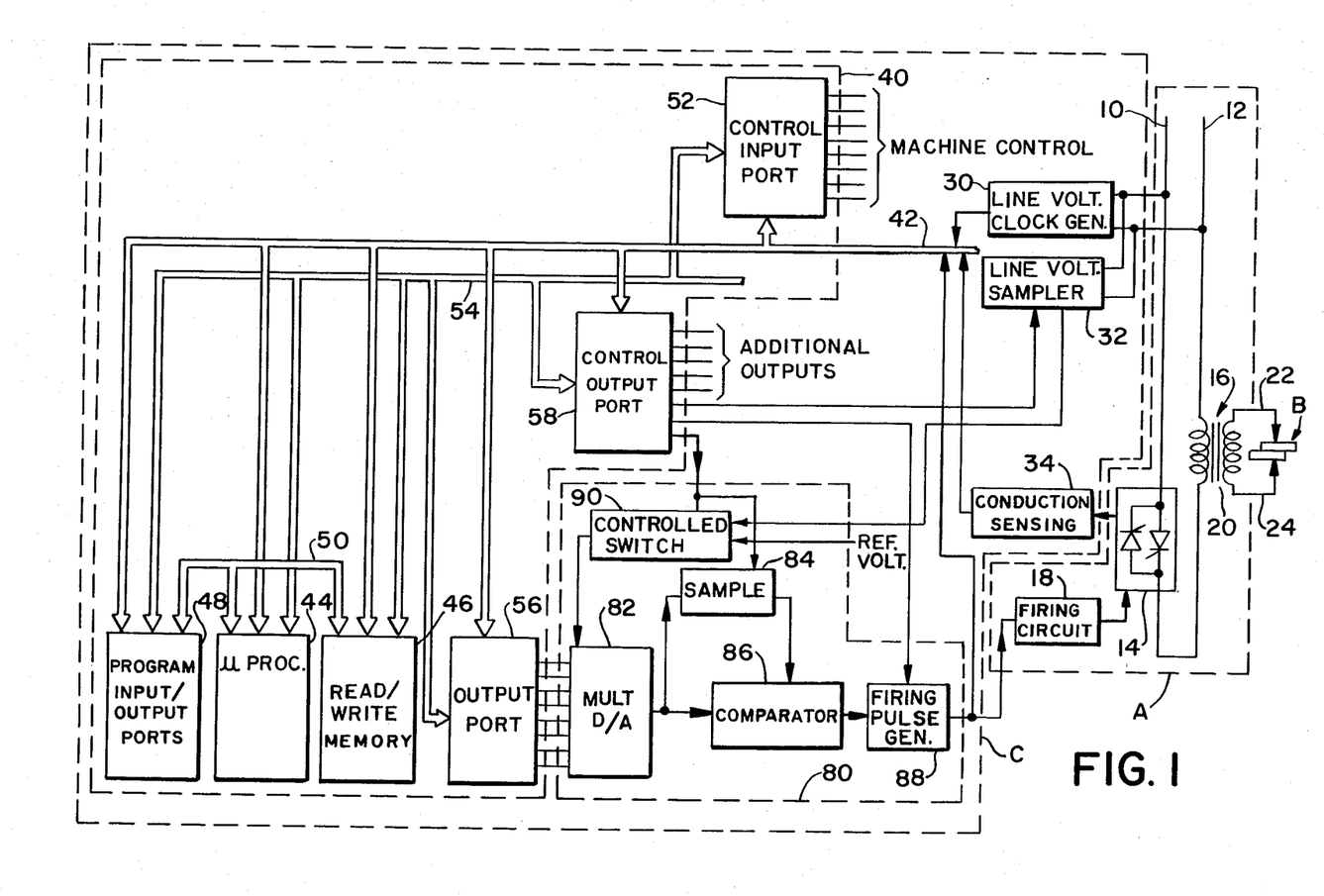
FIG. 1 is a block diagram of a welding apparatus and control circuit in accordance with the present invention.

With reference to FIG. 1, the welding means A includes voltage supply mains 10 and 12 which supply an AC electrical voltage. A phase-controllable contactor means 14 is connected with the mains for selectively conducting or blocking the flow of current from the mains to a welding load means 16. The contactor means may include a suitable pair of ignitron tubes, thyratron tubes, a triac, or the like. The contactor is controlled by a firing circuit 18 to determine the angle or time during each half line cycle that the contactor assumes a conductive state and conducts the weld current to the load 16. The welding load 16 includes a welding transformer 20 which is connected with a pair of electrodes 22 and 24. The electrodes are adapted to be clamped securely to the workpiece B which is to be welded.

The control circuit C includes electrical condition sensing means for sensing various electrical conditions of the welding means A. The electrical condition sensing means includes a line voltage clock generator 30 which monitors the line cycles of the welding voltage on the mains 10 and 12. More specifically, the line voltage clock generator produces clocking signals which indicate beginning or zero crossing points of each line voltage half cycle. A line voltage sampling means 32 samples the welding voltage on the mains and produces a weld voltage signal which varies with the root mean square or other normalized measurement of the voltage on the mains over the preceding half cycle or plurality of half cycles. In this manner, the weld voltage signal varies in proportion to variations in the actual welding voltage. A conduction sensing means 34 senses whether the contactor means 14 is in a conductive or nonconductive state and produces a conduction signal which indicates the state of the contactor means. It is to be appreciated that from the clocking signals, the line voltage signal, the conduction signal, and equations (1) through (5), the various circuit parameters including the firing angle a, the hangover angle b, and the RMS welding current are readily determinable.

A digital microcomputer 40 includes a control data bus 42 which receives the clocking signal, the line voltage signal, and the conduction signal for use in calculating these various circuit parameters. The control bus 42 is connected with a microprocessor 44, a read/write memory 46, and a program input-output port 48. The microprocessor under the control of the software which is discussed below in conjunction with FIG. 3 operates on the received data to calculate preselected circuit parameters. A memory address bus 50, together with data bus 54, provides communication between the program input-output port, the microprocessor, and the read/write memory. A control input port 52 is connected with a control panel or automated welding machine. An input/output data bus 54 connects the microprocessor 44, the read/write memory 46, and the program port with an output port 56 and a control port 58. Commonly, the automated welding machine controls and coordinates automatic feeding of workpieces to the electrodes 22 and 24, clamping of the electrodes to the workpieces with a preselected pressure, and the like. Further, an operator enters through the control panel or the automated welding machine the number of full or half line cycles which are to be in each weld and the magnitude of the weld current which is to be applied to the load in each half cycle, pulsation welding information, and the like.

A first preselected portion of the read/write memory 46 is loaded from the control panel with the preselected weld current which is selected for each half line cycle of the performed weld. The preselected weld current memory portion or means may be reloaded from a tape cassette or the like each time the welding apparatus changes weld types. Alternately, the preselected weld current memory portion may be preloaded with the selected currents for a plurality of welds and the control panel configured with a means to index the currents for one of the preselected weld types. For each preselected weld type, the preselected weld current memory portion is loaded with data representing an RMS weld current vs. half line cycle curve. Specifically, a 1×N memory may be loaded with the preselected weld current for each of the N half line cyles in the weld By addressing the preselected weld current memory portion with a half line cycle number, the preselected weld current for the addressed half line cycle is retrieved.

A second preselected portion of the read/write memory 46 is preloaded with a series of power factor correction curves. In the preferred embodiment, the power factor correction curve memory portion is a three dimensional look-up table of weld current vs. firing angle vs. hangover angle. Addressing the power factor correction curve memory portion with a firing angle and a hangover angle causes an indication of the RMS weld current produced under the addressed conditions to be retrieved.

Figure 2:
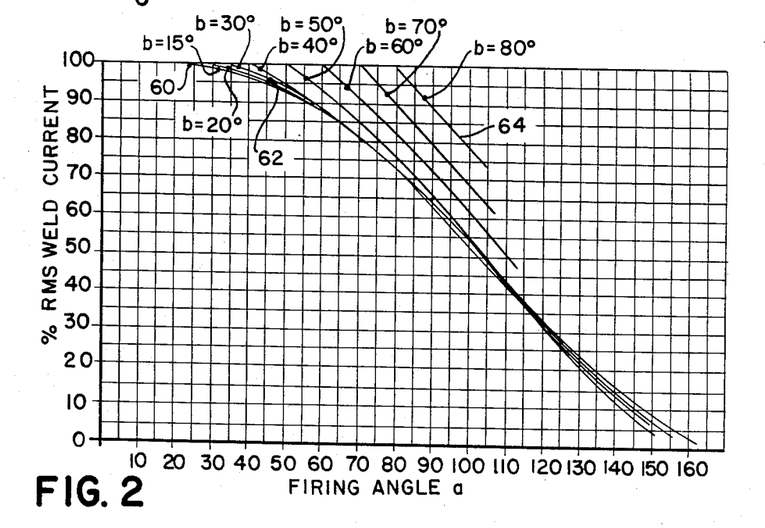
FIG. 2 is a plot of RMS current vs. firing angle for resistive-inductive loads at various preselected fixed hangover angles.

With reference to FIG. 2, a series of power factor correction curves is calculated from equations (4) and (5) or located in the appropriate texts. In determining the power factor correction curves, various combinations of the RMS weld current, firing angle, and hangover angle may be selected as the independent and dependent variables. In the preferred embodiment, a plurality of strings of data or curves each representing current vs. firing angle, a, for a fixed hangover angle, b, are stored. More specifically, the RMS weld current is stored as a percent of the maximum available RMS weld current to enable the same data or curve set to be used with different maximum available weld currents and different selected percent heat. As illustrated in FIG. 2, a first curve 60 corresponds to a hangover angle of 15°, a second curve 62 corresponds to a hangover angle of 20°, a last curve 64 corresponds to 80°, and a plurality of intermediate curves correspond to hangover angles between 20° and 80° at 10° intervals.

Briefly stated, in the preferred embodiment at the beginning of each half line cycle, a digital indication of the preselected RMS weld current which is to be applied is conveyed from the preselected weld current memory portion to the output port 56. The microprocessor selects the appropriate hangover angle curve to be utilized. As the half line cycle progresses, the present angle is used as the firing angle to address the selected hangover angle curve. This causes a weld current value to be retrieved from the power factor correction curve memory portion. The retrieved weld current value represents the RMS weld current which would actually be produced if the contactor 14 were fired at the present angle. The microprocessor supplies the retrieved digital present RMS weld current value to the output port 56. At short intervals, e.g., less than 1 degree, the microprocessor redetermines the RMS weld current which would be produced at the present angle and updates the digital present RMS weld current value at the output port 56. Thus, as the half line cycle progresses and the present firing angle becomes successively more retarded, the present RMS weld current value at the output port 56 decreases in the manner indicated by the selected FIG. 2 curve.

Connected with the digital microcomputer 40 is an analog control circuit 80. The analog control circuit 80 includes a multiplying digital-to-analog converter 82. The digital-to-analog converter converts each digital current value which it receives from the output port 56 to a corresponding analog voltage. The magnitude of the analog output voltages is multiplied or scaled by a reference voltage received on a reference input. When the preselected RMS weld current for the half cycle is at the output port 56, the control port 58 causes a sample and hold circuit 84 to store the analog preselected RMS weld current value. A comparator 86 compares the analog preselected weld current value stored in the sample and hold circuit 84 with the analog output of the digital-to-analog converter 82. When the analog present weld current value from the analog-to-digital converter 82 falls below the analog preselected weld current value from the sample and hold circuit 84, the comparator 86 enables a firing pulse generator 88 which causes the firing circuit 18 to render the contactor 14 conductive. In this manner, the microcomputer 40 based on the hangover angle of the preceding half cycle repeatedly determines the magnitude of the RMS welding current which would be produced if the contactor were fired at the present angle. When the determined RMS present weld current drops to or below the preselected RMS weld current, the contactor is fired. In the first half cycle of a weld, a preselected RMS weld current is supplied to the output port and the present RMS weld current is determined based on a preselected large hangover angle, e.g., 87°. A more detailed explanation of the functioning of the microcomputer is presented below in conjunction with the computer programming flow chart of FIGS. 3A and 3B.

To correct for fluctuations in the welding voltage on the mains 10 and 12, the control port 58 causes a switch 90 to connect the reference input of the digital-to-analog converter 82 with a standard reference voltage when the preselected weld current value is converted to an analog signal for storage in the sample and hold circuit 84. After the preselected weld current value is stored, the controlled switch 90 connects the line voltage signal from the line voltage sampling means 32 with the reference voltage input of the digital-to-analog converter. The line voltage signal scales the magnitude of the analog present weld current value in proportion to the present weld voltage. This assures that the preselected RMS weld current is applied to the load 16 rather than, as in the prior art, a percent of the maximum available weld current.

Figure 3A:
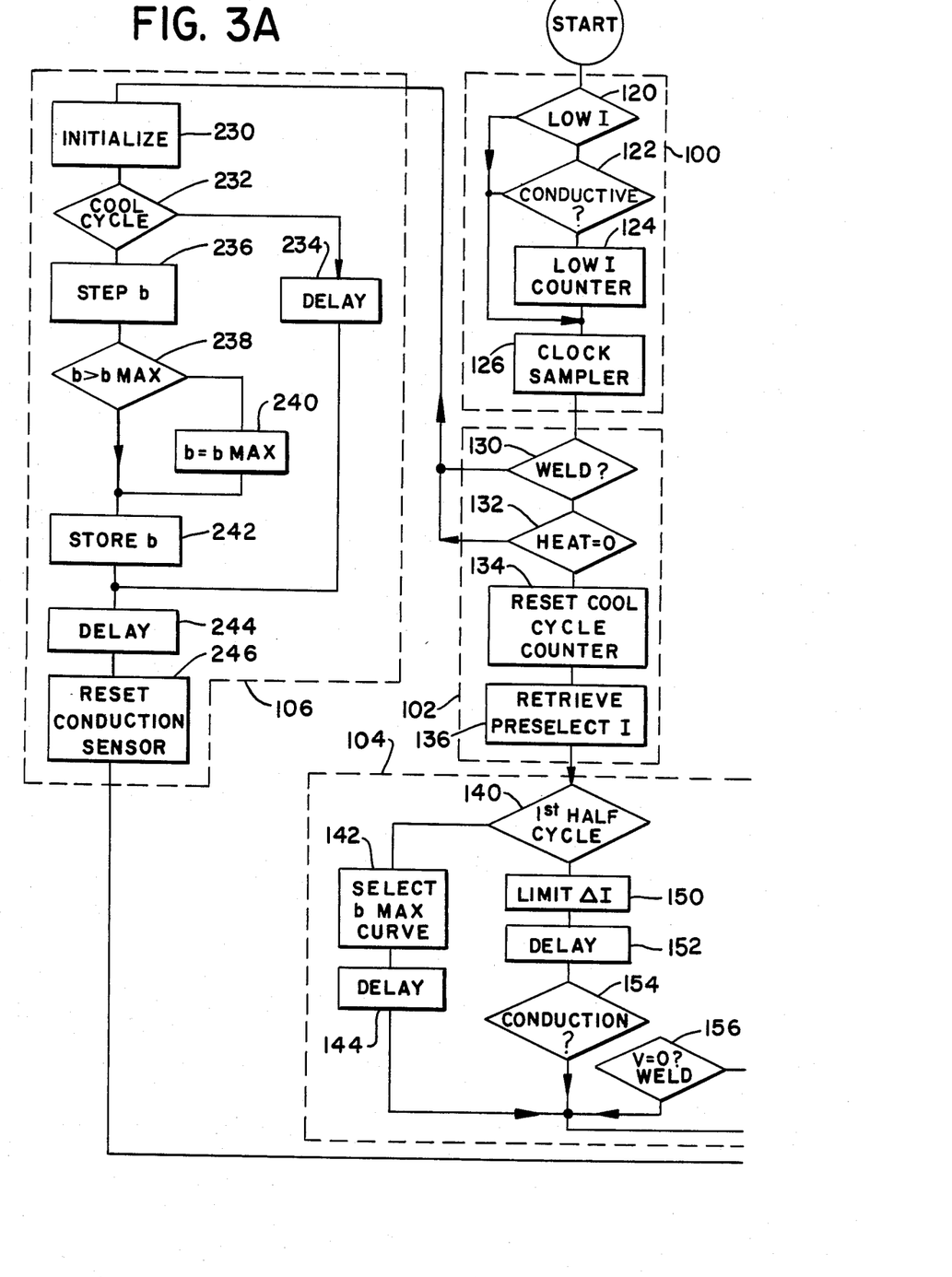
FIGS. 3A and 3B are a logic flowchart illustrating suitable software programming for the computer of FIG. 1; and, FIGS. 4A and 4B are a block diagram of an alternate embodiment of a welding apparatus and control circuit in accordance with the present invention.
Figure 3B:
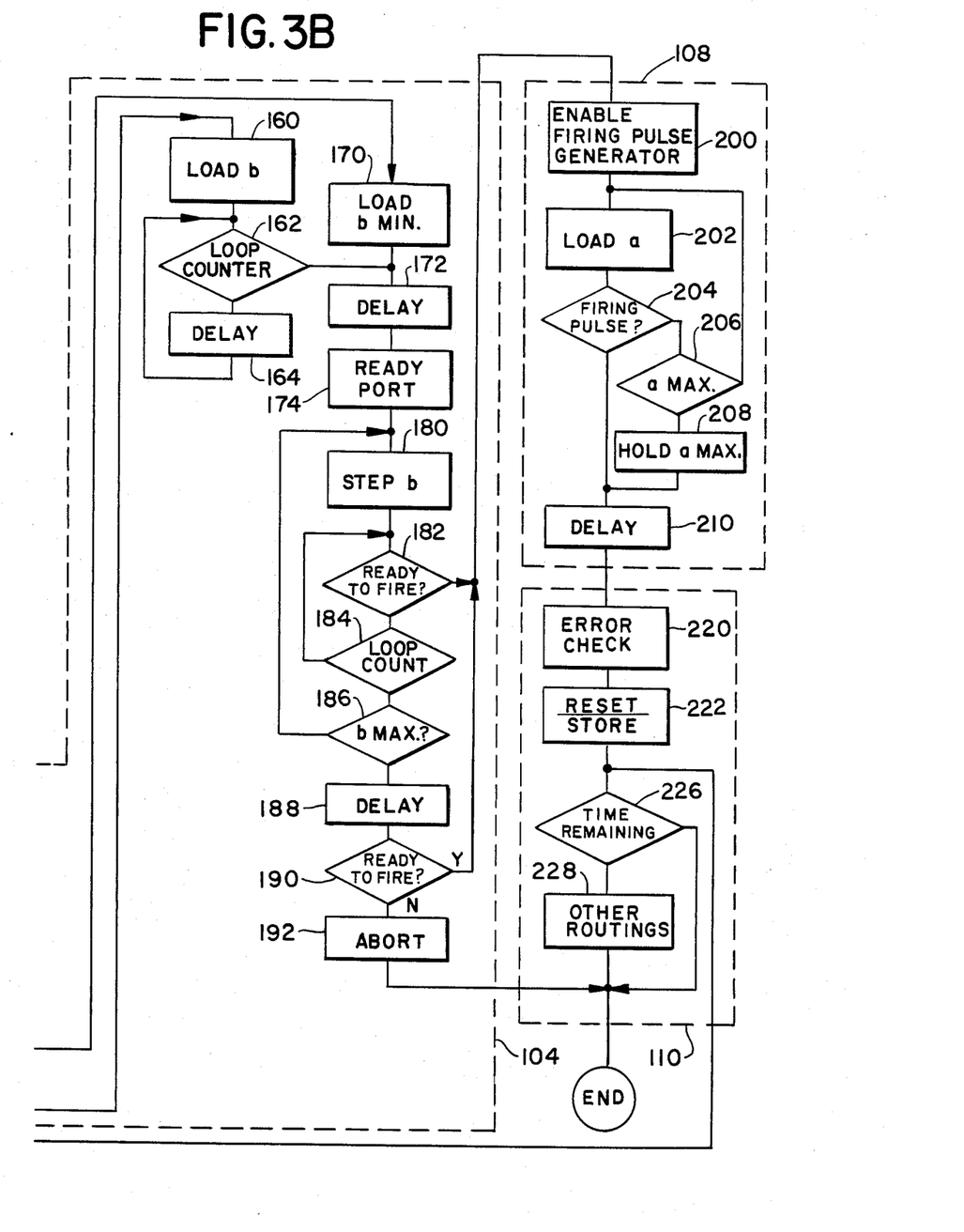

FIGS. 3A and 3B taken together illustrate a flowchart for a suitable program for implementing the present invention. The flowchart includes an initializing subroutine 100 for initializing various counters and determining the beginning of each half line cycle. A nonconducting half line cycle detecting subroutine 102 determines whether or not a welding current is scheduled to be produced in the present half line cycle. If the nonconducting half line cycle detecting subroutine 102 determines that a welding current is to be produced in the present half line cycle, a power factor correction curve selecting subroutine 104 determines which of the plurality of power factor correction curves are to be utilized. If the half line cycle is to be nonconductive, a cool or power factor correction curve selection adjustment subroutine 106 determines how many half cycles have elapsed since the contactor was last fired. Based on this duration, the cool subroutine determines an appropriate adjustment to the selection of a power factor correction curve for the next subsequent half cycle. The power factor correction curve adjustment is recalculated in each successive half cycle in which no weld current is produced. Once the appropriate automatic power factor correction curve is selected, an automatic power factor curve reading subroutine 108 steps incrementally along the selected power factor correction curve and provides weld current values to the output port 56 for the comparator 86 to compare with the preselected weld current value in the sample and hold circuit 84. A quality control subroutine 110 monitors the conditions under which welding current was produced or failed to be produced in each of the half cycles that a weld is scheduled and makes a determination of possible problems with the weld.

The initializing routine 100 includes a step or means 120 for determining whether or not the current is low, a step or means 122 for testing the contactor conduction sensor 34, and a step or means 124 for counting the number of half cycles with a low current. A sampling step or means 126 samples the output of the line voltage clock generator 30 for determining the beginning of each half line cycle and initializes a firing angle address clock pulse counter at the beginning of each half line cycle.

The nonconductive half line cycle detecting subroutine 102 includes a step or means 130 for determining whether a weld is called for in the present half cycle and a step or means 132 for determining whether or not a non-zero weld current is called for. If a weld with a non-zero weld current is to be produced, a step or means 134 resets a cool cycle counter which counts the number of half cycles since the last conductive half cycle. A preselected weld current retrieving step or means 136 retrieves the preselected weld current for the present half cycle from the preselected weld current memory portion of the read/write memory 46.

The power factor correction curve selecting means 104 includes a step or means 140 for determining whether or not any preceding half cycles in the current weld have been conductive. If none of the preceding cycles in the present weld have been conductive, a step or means 142 selects the last or maximum hangover angle power factor correction curve. The maximum hangover angle power factor correction curve, e.g., curve 64 of FIG. 2, provides the maximum firing angle retardation, hence the least power to the weld. A delay step or means 144 provides a short compensating time delay. If the step or means 140 determines that one of the preceding half cycles in the present weld has been conductive, a preselected weld current change limiting step or means 150 averages the preselected weld current with the preceding actual weld current to provide for a more gradual transition. This prevents coil saturations from rapid changes in the weld current. After the preselected weld current value is outputted to the output port 56, a time delay means 152 provides a short delay, e.g., 10 degrees, to allow time for the value to be stored in the sample and hold circuit 84. A conduction sensing step or means 154 determines whether or not the contactor is presently conductive. A step or means 156 determines whether or not there is a non-zero potential across the contactor.

With particular reference to FIG. 3B, if the contactor is not conductive or if there is a potential across it, a step or means 160 loads a curve pointer or counter with the appropriate hangover angle. Specifically, if the immediately preceding cycle was conducting, means 160 loads the hangover angle used at the beginning of the preceding cycle. If no preceding half cycle in the present weld was conductive, it loads the last power factor correction curve designation from the step or means 142. If the immediately preceding half cycle was nonconductive, but a preceding half cycle in the present weld was conductive, it loads a power factor correction curve designation from the power factor correction curve selecting means 106. A loop counting step or means 162 and a delay step or means 164 cycle for a period of time corresponding to the hangover angle stored in the curve pointer. More specifically, the steps or means 162 and 164 provide the appropriate delay for a power factor correction curve counter to be clocked to the power factor correction curve corresponding to the hangover angle loaded into the curve pointer.

If the contactor is conductive and there is no potential across it, a step or means 170 initializes the curve pointer to the first or minimum hangover angle. A delay step or means 172 provides a delay from the beginning of the weld half cycle which is equal to the number of degrees of the minimum hangover angle curve. In this manner, a delay is provided by step or means 164 and 172 which synchronizes the actual time or angle since the beginning of the half cycle with the power factor correction curve designated by the curve pointer. A step or means 174 prepares the output port to receive present RMS current values.

A step or means 180 steps the power factor correction curve pointer to the next higher curve indication. A step or means 182 determines whether or not the contactor is ready to be fired, that is, whether or not the contactor has become extinguished from the preceding half cycle. If the contactor is not ready to fire, a clocking loop step or means 184 determines whether or not the contactor has been checked a preselected number of times. The preselected number of times is selected to correspond to the number of loops between adjacent power factor correction curves. The step or means 184 causes the contactor to be repeatedly sampled until it is ready to fire or until the preselected number of loops have been counted. After the preselected number of loops have been counted, a step or means 186 determines whether or not the power factor correction curve pointer has been stepped to the last power factor correction curve. If it has not, the step or means 186 returns the program to the step or means 180 which increments the power factor correction curve pointer or counter. This cycle is repeated until the contactor is ready to fire or until the last curve is reached. If the last curve is reached before the contactor is ready to be fired, a step or means 188 provides a delay beyond the hangover angle of the last power factor correction curve to an angle which, under normal operating conditions, marks the last angle at which the contactor should be ready to be fired. A means 190 then checks whether or not the contactor is ready to be fired. If the contactor is still not ready to be fired, a step or means 192 ends the routine and returns the program to the initializing means 100 to await the next half cycle.

A ready-to-fire signal from step or means 182 or 190 is received by an enabling means 200 which enables the firing pulse generator 80. A firing angle address pointer or counter step or means 202 addresses the next successive firing angle of the selected power factor correction curve, causing the corresponding weld current to be retrieved. A step or means 204 monitors the firing pulse generator 88 to determine whether or not a firing pulse has been generated. A step or means 206 determines whether or not the last current value in the selected power factor correction curve has been reached. As long as the firing pulse is not generated or the last data value reached, a loop is set up to cause successive current values to be retrieved and outputted to the output port 56. The time to complete one loop through the steps or means 202, 204, and 206 is the same as the number of degrees between adjacent data values on each curve. In this manner, the loop through the steps or means 202, 204, and 206 clocks the firing angle address pointer. If the last value of the selected automatic power factor curve is reached, a last data output step or means 208 causes the last data value to be outputted to the port 56 and held. When a firing pulse is generated or the last data point is reached, a time delay step or means 210 provides a further delay to allow time for the firing pulse.

A step or means 220 determines whether or not the weld was improper for various reasons such as: too many half cycles during the weld failed to fire; a low current; or the like. A reset and storage step or means 222 resets the appropriate registers and causes the power factor correction curve pointer to store the hangover angle curve utilized. A step or means 226 determines the amount of time remaining in the present half cycle. If sufficient time remains, the step or means 226 passes control to communication or other routines which the computer is able to perform. After the communication routines are performed, the program ends and returns to the initializing subroutine 100 in time for the next half line cycle.

With particular reference to FIG. 3A, the power factor correction curve selection adjustment subroutine 106 includes an initializing subroutine 230 which resets the preselected weld current retrieving step or means 136. A comparing step or means 232 compares the count on a cool cycle counter with a preselected value. If the cool cycle counter fails to meet a preselected value, the subroutine proceeds through a delay step or means 234 to the end of the routine to await the next half line cycle. If the cool count matches the preselected value, then a step or means 236 resets the cool counter and steps the power factor correction curve counter or pointer one step. A comparing step or means 238 determines whether or not the automatic power factor correction curve counter has been stepped beyond the last curve. If it has, a step or means 240 resets the power factor correction curve pointer to the last curve. A step or means 242 causes an indication of the indexed power factor correction curve to be stored. A delay step or means 244 provides a short delay before the subroutine exits and awaits the beginning of the next half line cycle. In this manner, each time a preselected number, e.g., 4, of successive line half cycles are nonconductive, the power factor correction curve selection is advanced one curve toward the last curve. A reset step or means 246 resets the conduction sensor 34.

Figure 4A:
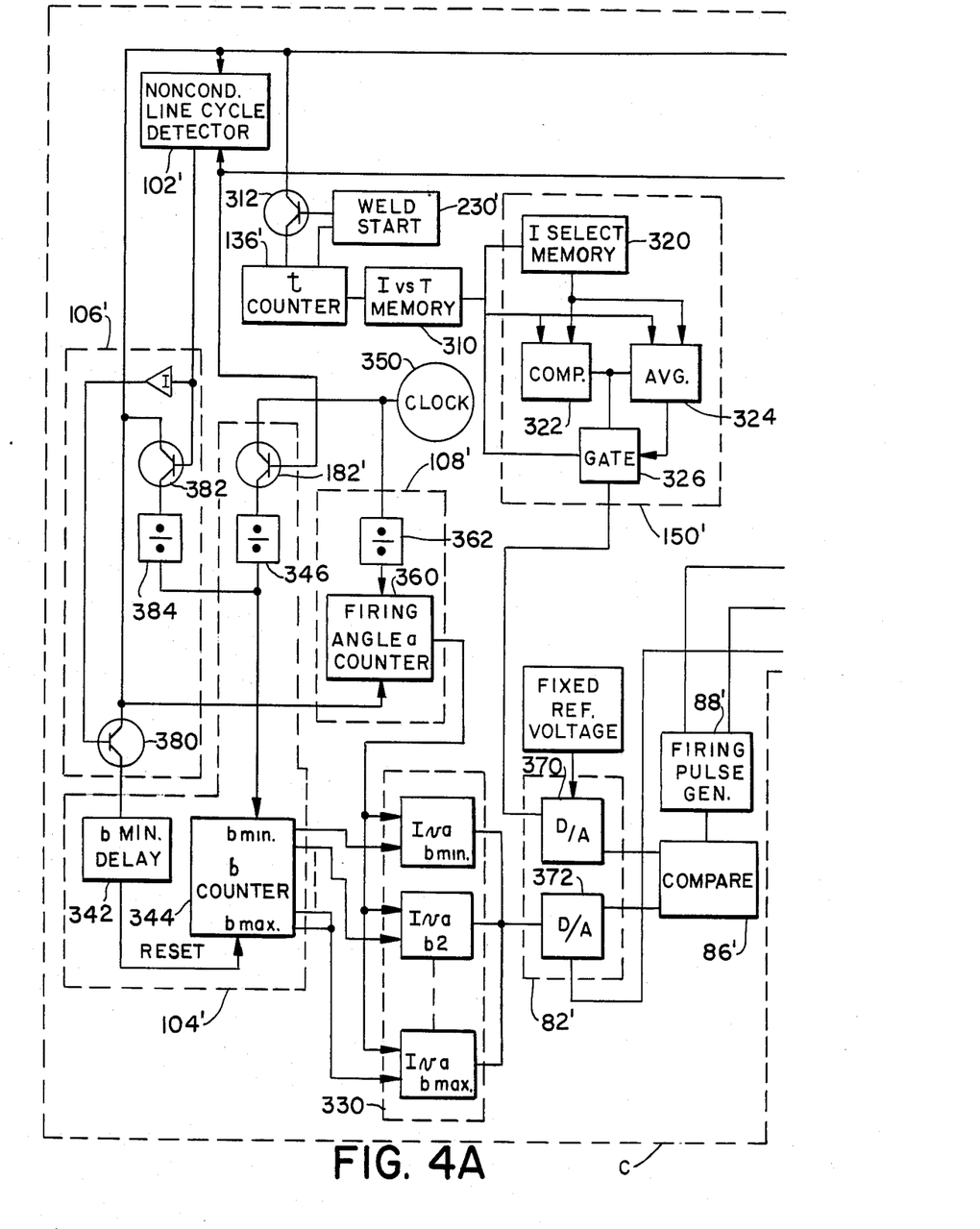
Figure 4B:
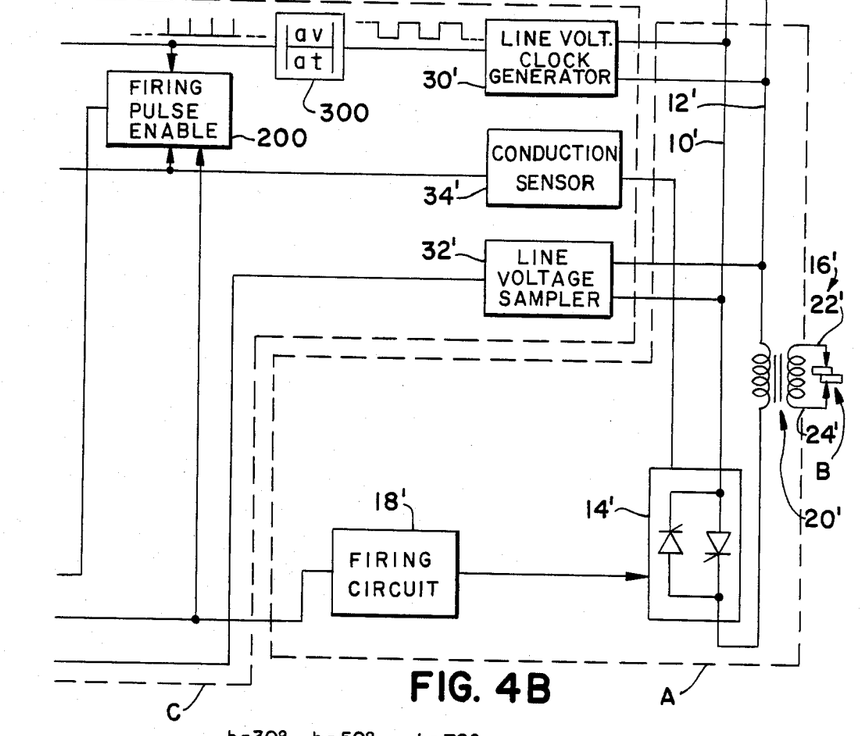

FIGS. 4A and 4B taken together show an alternate embodiment of a phase-controlled welding apparatus in accordance with the present invention. In the embodiment of FIGS. 4A and 4B, circuit components which perform the same function as like components or programming steps in the embodiment of FIGS. 1 and 3 are denoted by the same referenced numeral followed by a prime ('). With particular reference to FIG. 4B, a welding means A includes a pair of mains 10' and 12' which receive the AC welding voltage. A phase-controllable contactor 14' under the control of firing circuit 18' selectively controls the weld current passing through a welding load means 16'. The weld load means includes a welding transformer 20' and a pair of electrodes 22' and 24' which are adapted to clamp the workpiece B therebetween.

The control circuit C includes a line voltage clock generating means 30' which produces line clock signals in coordination with the voltage phase or line cycles of the AC electric power on the mains. More specifically, the line voltage clock generator produces a square wave clocking signal which changes between a high and low state at the beginning of each voltage half line cycle. A circuit 300 converts the square wave clock signal into a series of clocking pulses or spikes, each spike corresponding to the zero crossing point or beginning of a half line cycle. This transformation in the clocking cycle can be achieved with a circuit which takes the absolute value of the derivative of the square wave clocking signal. A line voltage sampling means 32' produces a weld voltage signal which varies with the RMS weld voltage. A conduction sensing means 34' produces an output signal which indicates whether or not the contactor 14' is in a conductive or nonconductive state.

With particular reference to FIG. 4A, a preselected welding current memory means 310 is preloaded with the preselected weld current signal which indicates a preselected current magnitude which has been selected for each half line cycle of the weld type to be performed. In the preferred embodiment, the preselected weld current memory 310 is adapted to be reloaded with different preselected weld current vs. line half cycle curves such that the control may be used to control different types of welds. A preselected weld current retrieving means 136' is connected with the line voltage clock generating means to be stepped at the beginning of each half line cycle during the weld. The preselected weld current retrieving means 136' is connected with the preselected weld current memory 310 to cause the preselected weld current for the present half cycle to be read out. A weld start circuit 230' operates a gate means 312 and resets the preselected weld current retrieving means 136' when a weld is to be commenced.

A weld current change limiting means 150' limits the amount of change in the weld current. Specifically, a preceding half cycle preselected weld current memory means 320 stores the weld current of the preceding half line cycle. A weld current change comparing means 322 compares the present half line cycle preselected weld curren with the preceding half line cycle weld current. If the present half line cycle preselected weld current exceeds the preceding half line cycle weld current by more than a preselected minimum difference, an averaging means 324 averages the present and preceding half line cycle preselected weld currents and a gate means 326 causes the average preselected weld current to be substituted for the retrieved preselected weld current. In this manner, the weld current change limiting means 150' prevents the weld current from increasing so fast that the welding transformer core may become saturated.

A power factor correction curve memory means 330 provides a look-up table from which the present weld current is looked up by addressing it with the corresponding firing angle and hangover angle. In the preferred embodiment, the power factor correction curve memory means includes a plurality of memory means, each of which stores a data series which represents the curve or relationship between the RMS welding current vs. the firing angle for one of a plurality of preselected fixed hangover angles as discussed above in conjunction with FIG. 2. It has been found that satisfactory results are achieved when a minimum hangover angle which indexes the first power factor memory means corresponds to $17\frac{1}{2}°$, a maximum hangover angle which indexes the last power factor memory means corresponds to 87°, and hangover angles which index the intermediate memories corresponds to 5.25° intervals.

A power factor correction curve selecting means 104' selects the appropriate power factor correction curve. The power factor correction curve selecting means includes a delay means 342 which has a delay equal to the hangover angle of the first power factor correction curve, in the preferred embodiment $17\frac{1}{2}°$. The hangover angle delay means 342 is connected between the line voltage clock generator means 30' and the reset input of a power factor correction curve address counter or pointer means 344. At the first or minimum hangover angle, the power factor correction curve address counter means 344 is reset to its ground state in which it enables the first or minimum hangover angle power factor correction curve submemory of the power factor correction curve memory means 330. A stepping input of the power factor correction curve address counter means 344 is connected by a divider 346 and a gate means 182' with a clock means 350. The gate means 182' is controlled by the conduction sensing means 34' to enable clock pulses from the clock 350 to step the power factor correction curve address counter means 344 while the contactors are conducting. The dividing means 346 and the frequency of the clock 350 are coordinated such that the interval between steps of the power factor correction curve address counter means 344 corresponds to the difference in the hangover angles between successive power factor curves, in the preferred embodiment approximately 5.25°. In this manner, at the beginning of a half line cycle, the delay means 342 causes the first power factor correction curve to be addressed when the first curve hangover angle has elapsed. Thereafter, at each hangover angle interval, the next power factor correction curve is addressed. When the contactor stops conducting and is ready to be fired, the gate means 182' fixes the addressed power factor correction curve.

A power factor correction curve reading means 108' reads the power factor correction curve or data series which is addressed by the power factor correction curve selecting means 104'. More specifically, the power factor correction curve reading means determines the present angle or duration in degrees which have passed since the beginning of each half cycle. The present angle is used to address the firing angle input of the power factor correction curve memory means 330. The power factor correction curve reading means includes a firing angle address counter or pointer means 360 which is reset by the clocking pulse at the beginning of each half cycle. A dividing means 362 connects the firing angle address counter means 360 with the clock means 350 to cause it to address subsequent addresses at regular intervals. The dividing means 362 is selected relative to the frequency of the clock 350 such that the firing angle address counter means is stepped to address the firing angle which most closely corresponds to the present angle. In this manner, the weld current value retrieved from the power factor correction curve memory indicates the weld current which would be produced if the contactor were fired at the present angle.

The preselected RMS weld current and the present RMS weld current as read out from the power factor correction curve power factor memory means are conveyed to a digital-to-analog converter means 82'. The digital-to-analog converter includes a first digital to analog converter 370 which is biased by a fixed reference voltage for converting the preselected weld current from digital-to-analog and a second digital-to-analog converter 372 whose reference voltage input is connected with a line voltage sampling means 32' to adjust for fluctuations in the weld voltage. The outputs of the digital-to-analog converters are connected with a comparing means 86'. When the comparing means 86' detects that the output of the second digital-to-analog converter 372 has dropped below the output of the first digital-to-analog converter 370, it triggers a firing pulse generator 88' which in turn enables the firing circuit 18' to render the contactor 14' conductive. A firing pulse enables means 200' to be connected with the line voltage clock generating means 30', the conduction sensing means 34', and the firing circuit 18' and provides an output which selectively enables and disables the firing pulse generator 88'. The firing pulse enabling means circuit causes the firing pulse generator to be disabled from the time the contactor 14' is rendered conductive in one half cycle until it ceases conducting in the subsequent half cycle. This prohibits the contactor from being rendered conductive at an inappropriate time.

On the first half cycle of the weld sequence, there is, of course, no hangover angle from the preceding half cycle. To prevent saturation of the welding transformer core, it is customary to prevent firing of the first half cycle before approximately 85° to 87°. In the preferred embodiment, the last power factor correction curve corresponds to a hangover angle of 87°. Thus, by addressing the last power factor curve during the first half cycle of a weld, the firing angle is retarded to at least 87°. During pulsation welding, the interval between each series of weld pulses is commonly sufficiently short that it is unnecessary to retard the firing angle of the first half cycle in each series fully to 87°. In the first half cycle of intermediate pulsation welding series, a power factor correction curve selection adjustment means 106' adjusts the power factor correction curve selected by the power factor correction curve selecting means 104' to compensate for the decay of transformer core flux since the last firing. A nonconducting half line cycle detecting means 102' causes a gate means 380 to block the clocking signals from reaching the minimum hangover angle delay means 342 during nonconducting half cycles. This holds the power factor correction curve counter means 344 at the power factor correction curve corresponding to the hangover angle of the last conductive half cycle. Further, the nonconducting half line cycle detecting means controls another gate means 382 which gates the signals from clock 350 through a divider 384 to the stepping input of the power factor correction curve counter means 344. After a fixed number of nonconductive cycles, the curve counter is stepped one step toward the maximum hangover angle. The stepping rate, hence the divider 384, is selected to approximate the decay rate of magnetic flux in the core of the welding transformer. In this manner, the power factor correction curve counter means 344 addresses the power factor correction curve which would produce the largest weld current without saturating the weld transformer core. It is to be appreciated that the present scheme uses a linear approximation of the flux decay in the welding transformer core. It has been found that for pulsation welding a linear approximation to the exponential flux decay produces satisfactory results. If a closer approximation is desired, the divider 384 may be replaced with a circuit which is reset with each conductive weld cycle and, during nonconductive weld cycles, exponentially increases the number of clock signal pulses which are required to step the curve counter means 344. On the first half cycle of a weld or after a sufficiently long nonconductive period within a pulsation weld, the curve counter means 344 steps to address the power factor correction curve which corresponds to the maximum hangover angle.

The invention has been described with reference to the preferred and alternate embodiments. Obviously, modifications and alterations will occur to others upon reading and understanding the preceding detailed description. For example, the preselected weld current can address the power factor correction curve memory means to retrieve a corresponding firing angle for the selected fixed hangover angle. The comparing means can compare the present angle from the angle counter 360 with the retrieved firing angle and to trigger the contactor when the present and firing angles are substantially coincident. The invention is to be construed as including all alternatives and modifications insofar as they come within the scope of the appended claims or the equivalents thereof.

Having thus described the invention, it is now claimed to be:

1. A computer-controlled welding apparatus comprising:
   a phase-controllable contactor means for selectively conducting AC electric power to a welding load means, the electric power including a plurality of cyclically occurring voltage half line cycles;
   a line voltage clock generator for generating clocking signals at a preselected point in each of the voltage half line cycles of the AC electric power, the clocking signals being indicative of the beginning of each half line cycle;
   a conduction sensing means for producing a conduction signal which indicates whether the contactor means is conducting welding power to the welding load means, the conduction sensing means being operatively connected with at least one of the contactor means and the load means;
   a digital computer operatively connected with the line voltage clock generator and the conduction sensing means, the digital computer:
      producing digital preselected weld current signals each indicating a preselected weld current to be conducted by the phase-controllable contactor means during one of the half line cycles, and
      repeatedly between clocking signals producing real time digital present weld current signals indicating the weld current which would flow through the contactor means if the contactor were rendered conductive at a present time since the beginning of each of the half line cycles; and,
   comparing means for comparing the preselected and a corresponding present weld current signals, the comparing means being operatively connected with the contactor means for selectively causing the contactor means to conduct welding power to the welding load means.

2. The computer-controlled welding apparatus as set forth in claim 1 further including a digital-to-analog converter means for converting the digital preselected and present weld current signals from digital to analog, the comparing means being an analog comparing means and being operatively connected with the digital-to-analog converter means.

3. The computer-controlled welding apparatus as set forth in claim 2, further including a sample and hold means for storing the preselected weld current signal, the sample and hold means being operatively connected with the digital-to-analog converter and the comparing means, whereby the digital computer can produce the preselected and present weld current signals serially.

4. The computer-controlled welding apparatus as set forth in claim 3 further including analog scaling means for scaling an analog present weld current signal in proportion to the magnitude of received voltage such that compensation is made for weld voltage fluctuations.

5. A phase-control apparatus for controlling AC power in a circuit in which an AC current component tends to lag an AC voltage component, the apparatus comprising:
   a controllable contactor means for selectively conducting the current component;
   a line voltage clock generator for generating a line clock signal which indicates the phase of the AC voltage component;
   a conduction sensing means producing a conduction signal which indicates whether the contactor means is conducting;
   a preselected current memory means for storing a preselected current signal which indicates a preselected current magnitude which is selected to be conducted by the contactor means during each of a plurality of voltage component half line cycles;
   a power factor correction curve memory means for storing a plurality of data series which represent a relationship between current magnitude, firing angle, and hangover angle such that addressing the power factor correction curve memory means with a firing angle signal and a hangover angle signal retrieves a present current signal which indicates a current magnitude which is produced when the contactor means is rendered conductive under the addressed firing and overhang angle conditions;
   a power factor correction curve selecting means for selecting a hangover angle signal for addressing the power factor correction curve memory means, the power factor correction curve selecting means being operatively connected with the line voltage clock generator and the conduction sensing means;
   a power factor correction curve reading means for repeatedly generating firing angle signals for addressing the power factor correction curve memory means, each firing angle signal corresponding to a duration since the beginning of each of the half line cycles, the power factor correction curve reading means being connected with the line voltage clock generator; and,
   comparing means for comparing the preselected current signal with the present current signal, the comparing means being operatively connected with the contactor means for selectively causing the contactor means to conduct current based on the comparison between the preselected and present current signals.

6. The phase control apparatus as set forth in claim 5 wherein each of the data series stored by the power factor correction curve memory means represents a curve of the relationship between current magnitude and firing angle at one of a plurality of fixed hangover angles.

7. The phase control apparatus as set forth in claim 6 wherein the power factor correction curve selecting means includes means for measuring the hangover angle of a preceding half line cycle, the hangover angle signal corresponding to the measured hangover angle.

8. The phase control apparatus as set forth in claim 6 wherein the power factor correction curve selecting means includes a power factor correction curve address counter means for addressing each of the plurality of data series in a predetermined order, the power factor correction curve address counter means being connected with a clocking means, the line clock generator, and the conduction sensing means to be stepped periodically between the beginning of each half line cycle and the extinction of current flow from a preceding half line cycle such that the power factor correction curve address counter means measures the hangover angle from the preceding half cycle and addresses the corresponding data series.

9. The phase control apparatus as set forth in claim 8 wherein the power factor correction curve selecting means includes means for resetting the power factor correction curve address counter means near the beginning of a half line cycle.

10. The phase control apparatus as set forth in claim 8 further including means for averaging a preceding preselected current signal with the preselected current signal and supplying an averaged current signal to the comparing means, whereby rapid variations in the preselected current are inhibited.

11. The phase control apparatus as set forth in claim 8 further including a welding transformer connected with the contactor means such that the contactor means controls the flow of welding current through the welding transformer, whereby the weld power to a wordpiece is controlled.

12. The phase control apparatus as set forth in claim 9 wherein the resetting means includes a delay means for delaying the resetting of the power factor correction curve address counter means for a duration corresponding to a first of the plurality of fixed hangover angles.

13. The phase control apparatus as set forth in claim 8 further including a means for detecting half line cycles in which the contactor means is nonconductive and a power factor correction curve selection adjustment means for stepping the power factor correction curve address counter means in response to nonconductive half line cycles, whereby during pulsation welding in which nonconductive half line cycles are interspersed among conductive half line cycles, one of the data series is selected based upon the hangover angle of a preceding conductive half line cycle and a number of intervening nonconductive half line cycles.

14. A computer-controlled welding apparatus comprising:
a phase-controllable contactor means for selectively conducting AC electric power to a welding load;
a line clock generator for generating clocking signals in coordination with half line cycles of a voltage component of the AC electric power;
a conduction sensing means for producing a conduction signal which indicates whether the contacting means is conducting welding power to the welding load means;
a digital computer including:
a power factor correction curve memory means for storing a plurality of data series, each data series representing a relationship between weld current magnitude and firing angle for a fixed hangover angle such that addressing the power factor correction curve memory means with a hangover angle signal selects a corresponding one of the data series and addressing the power factor correction curve memory means with either one of a firing angle signal or a current magnitude signal retrieves the signal which was not used to address the power factor correction curve memory means;
a power factor correction curve selecting means for producing a hangover angle signal for addressing the power factor correction curve memory means, the power factor correction curve selection means being operatively connected with the line voltage clock generator and the conduction sensing means;
a preselected current memory means for storing preselected current signals each of which indicates a preselected current magnitude which is selected to be conducted by the contactor means during one of a plurality of voltage component half line cycles;
present angle determining means for repeatedly determining a present angle signal which is indicative of a duration since the beginning of each half line cycle;
a power factor correction curve reading means for addressing the power factor correction curve memory means with one of the present angle signal and the preselected current signal to produce a retrieved signal; and,
comparing means for comparing the other of the present angle signal and the preselected current signal than said one which addressed the power factor connection curve memory means with the retrieved signal, the comparing means being operatively connected with the contactor means for selectively causing the contactor means to conduct current based on the comparison.

15. In a computer-controlled welding apparatus which includes a contactor means for selectively conducting elding power to a welding load, a line voltage clock generator for generating clocking signals at a preselected point in each voltage line cycle of AC electric welding power, a conduction sensing means for sensing conduction of the contactor means, and a control circuit including a digital computer for controlling the contactor means, a method of real time of computer-controlled welding comprising:
retrieving from memory a preselected weld current magnitude for a present half line cycle of the weld;
as the present half line cycle progresses, repeatedly determining a present weld current magnitude which would flow through the contactor means if the contactor were rendered conductive at each of a plurality of present times since the beginning of the present half line cycle;
comparing the preselected weld current magnitude with each present weld current magnitude; and,
rendering the contactor means conductive when the preselected and present weld current magnitude are substantially coincident, whereby the preselected weld current magnitude for each half line cycle is caused to flow through the contactor means in the corresponding half line cycle.

16. The method of computer-controlled welding as set forth in claim 15 wherein the preselected weld current magnitude and the present weld current magnitude are each represented by digital electrical signals and further including the step of converting the digital preselected and present weld current signals to analog preselected and present weld current signals before the comparing step.

17. The method of computer-controlled welding as set forth in claim 16 further including scaling an analog present weld current signal in proportion to welding voltage.

18. In a computer-controlled welding apparatus which includes a contactor for selectively conducting welding power to a welding load, a line voltage clock generator for generating clocking signals in coordination with voltage line cycles of AC electirc welding power, a conduction sensor for sensing conduction of the contactor, and a control circuit including a digital computer for controlling the contactor, a method of computer-controlled welding comprising:

retrieving from memory a preselected weld current magnitude for a present half line cycle of the weld;

determining a hangover angle of the weld current in a preceding half line cycle;

selecting a weld current vs. firing angle curve for a fixed hangover angle, which fixed hangover angle is generally equal to the determined hangover angle;

during the present half line cycle as the firing angle increases, addressing the selected curve a plurality of times with an instant firing angle and reading a corresponding weld current magnitude;

comparing the magnitude of each weld current magnitude read from the selected curve with the preselected weld current magnitude; and, rendering the contactor conductive when the preselected and present weld current magnitudes are substantially coincident.

19. In a computer-controlled welding apparatus which includes a contactor means for selectively conducting welding power to a welding load, a line voltage clock generator for generating clocking signals in coordination with voltage line cycles of AC electric welding power, a conduction sensing means for sensing conduction of the contactor means, and a control circuit including a digital computer for controlling the contactor means, a method of computer-controlled welding comprising:

storing a plurality of data series, each representing welding current vs. firing angle for one of a plurality of fixed overhang angles;

retrieving from memory a preselected weld current magnitude for a present half line cycle of the weld;

selecting an appropriate one of the data sets;

periodically during the present half line cycle, addressing the selected data set a plurality of times, each time with an instant firing angle and reading a corresponding present weld current magnitude;

comparing the preselected weld current magnitude with each present weld current magnitude; and, rendering the contactor means conductive when the preselected and present weld current magnitude are substantially coincident.

20. The method of computer-controlled welding as set forth in claim 19 wherein the step of selecting one of the data series includes, between the beginning of the present half line cycle and the extinction of the weld current from the preceding half line cycle, periodically stepping from one of the plurality of data series to another in a preselected order.

21. The method of computer-controlled welding as set forth in claim 20 wherein the step of selecting one of the plurality of data series includes, after a preselected number of nonconductive half line cycles, stepping from one of the data series to the next in the preselected order.

22. The method of computer-controlled welding as set forth in claim 21 further including, in the first conductive half line cycle of a weld, stepping to the last data series in the preselected order.

23. A method of phase control for AC electric power in which a current component tends to lag a voltage component, the method comprising:

storing a plurality of data series, each of which represents a relationship between current magnitude and firing angle corresponding to one of a plurality of fixed hangover angles;

determining the beginning of a present voltage half line cycle;

monitoring the duration in which current from a preceding half cycle extends into the present half cycle to determine a hangover angle;

indexing one of the plurality of data series corresponding to the determined hangover angle;

during the present half cycle as the firing angle increases, addressing the data in the indexed data series a plurality of times within the instant firing angle and determining a corresponding present current magnitude;

comparing the present current magnitude from the indexed data series with a preselected current magnitude for the present half cycle; and, when the present current magnitude and the preselected current magnitude are substantially coincident commencing conducting the current component.

* * * * *